June 20, 1967 — J. H. SHEPLEY — 3,326,575

HITCH

Filed Sept. 2, 1965

INVENTOR.
JOHN H. SHEPLEY
BY
Joseph A. Brown
ATTORNEY

United States Patent Office 3,326,575
Patented June 20, 1967

3,326,575
HITCH
John H. Shepley, Lancaster, Pa., assignor to Sperry Rand Corporation, New Holland, Pa., a corporation of Delaware
Filed Sept. 2, 1965, Ser. No. 484,706
7 Claims. (Cl. 280—515)

This invention relates to a hitch device for connecting a vehicle tongue to the drawbar of a tractor or the like.

In connecting the tongue of a forage harvester, for example, to the drawbar of the tractor, the operator backs the tractor to a location where a hitching can be accomplished. Conventionally, a hitch pin is dropped down through aligned holes in the clevis of the implement tongue and through a hole in the tractor drawbar. The problem is that the drawbar hole must be aligned with the holes in the clevis for the pin to be inserted. When the operator gets off the tractor to insert the hitch pin, he frequently finds that the clevis holes are out of alignment with the drawbar hole. Then he must climb back on the tractor and maneuver it to line up the parts which are to be connected.

On some occasions, the operator is able to obtain a hitching on the first try. However, at other times alignment problems occur and the operator must get on and off the tractor several times before a hitching can be made.

One object of this invention is to provide an improved hitch device to facilitate the task of connecting an implement tongue to a tractor drawbar.

Another object of this invention is to provide a hitch device which is controlled by the operator on the tractor and does not require leaving the tractor seat.

Another object of this invention is to provide a hitch device so constructed that the operator on the tractor can sight from above through the upper clevis hole and align the tractor drawbar hole with it and without ever leaving the tractor seat.

A further object of this invention is to provide a hitch device which is relatively simple and low cost, whereby it is inexpensive to manufacture and easy to keep in operating order.

Other objects of this invention will be apparent hereinafter from the specification and from the recital in the appended claims.

Figure 1:
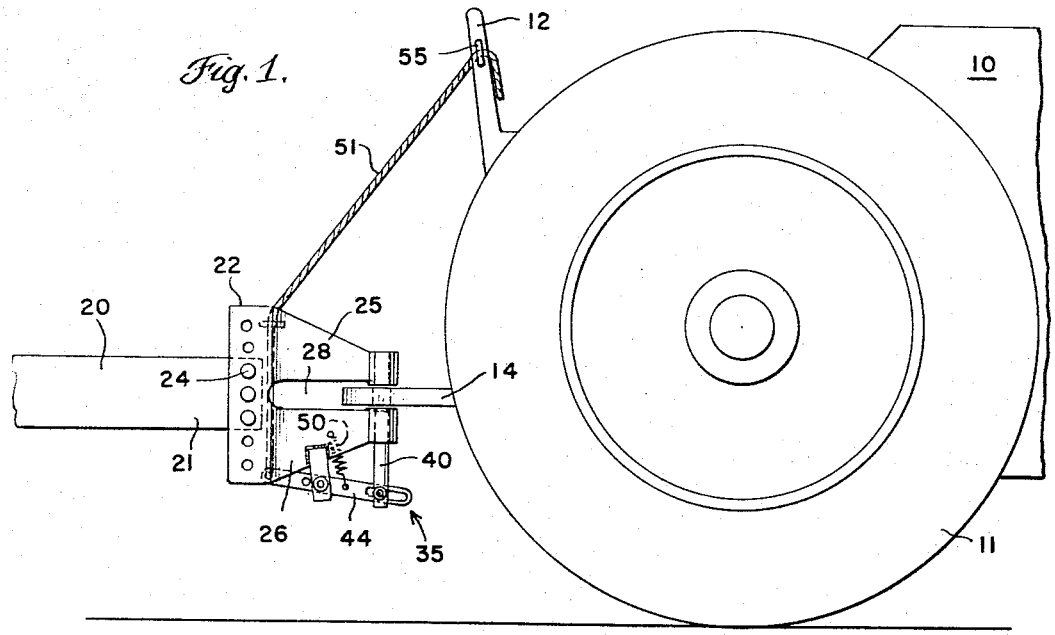
FIG. 1 is a fragmentary side elevation showing a tractor having a drawbar to which a vehicle tongue is hitched by means of a hitch device constructed according to this invention, the hitch pin being shown in retracted position.

Referring now to the drawing by numerals of reference, and first to FIG. 1, 10 denotes generally a tractor having ground wheels, one of which is shown at 11, a seat 12, and a rearwardly extending drawbar 14. The drawbar is conventional and comprises a piece of bar stock having a vertical hole 15.

Adapted to be connected to drawbar 14 is the tongue 20 of some vehicle. The forward end 21 of the tongue has a clevis 22 connected to it by transverse bolts 24. The clevis has an upper arm 25 and a lower arm 26 which extend horizontally in vertically spaced relation to each other to provide a space 28 for receiving drawbar 14. The forward end of the upper arm 25 has a hole 30 and the forward end of the lower arm 26 has a similar hole 31. The holes 30 and 31 are in register with each other and they are coaxial. As shown best in FIG. 2, the spacing between the upper and lower clevis arms is such that the drawbar is freely accommodated.

To connect clevis 22 to drawbar 14, a hitch device 35 is provided. This device comprises a vertically extending hitch pin 40 which slidably extends through hole 31 of lower arm 26. At its lower end 41, pin 40 is supported by a bolt 42 which projects through a lever support arm 44 pivotally carried by a bolt 45 on support bracket 46. The pivotal connection of lever 44 with bracket 46 provides a transverse axis relative to the extension of the pin 40. This pivot axis is parallel to the axis of bolt 42. Bolt 42 extends through a slot 48 whereby a lost-motion connection results between lever 44 and the lower end 41 of hitch pin 40.

Figure 2:
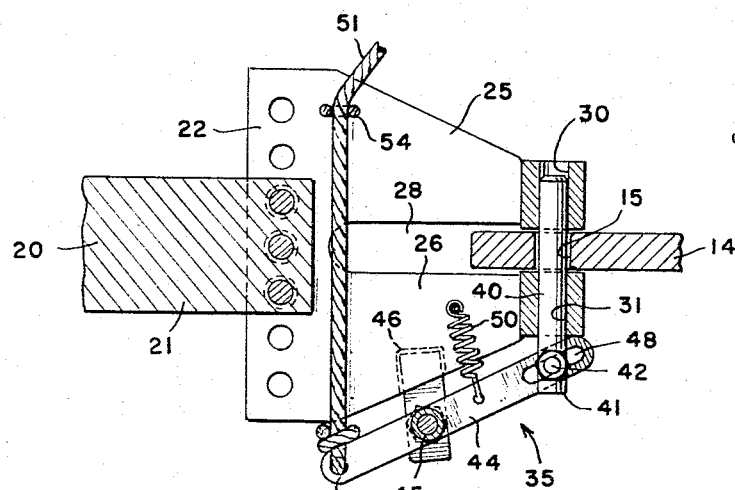
FIG. 2 is an enlarged vertical section through the hitch device taken on the line 2—2 of FIG. 3 looking in the direction of the arrows and showing the hitch pin projected through the drawbar.
Figure 3:
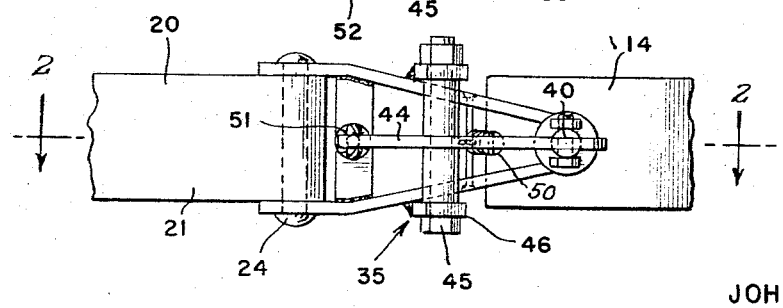
FIG. 3 is a view looking upwardly from the bottom of FIG. 2.

Lever 44 is normally retained in the position shown in FIG. 2 by a tension spring 50 connected between clevis lower arm 26 and the lever at a point between pivot bolt 45 and the connecting bolt 42. When lever 44 is in such normal position, spring 50 is retracted and hitch pin 40 is projected upwardly through hole 15 in drawbar 14 and into the hole 30 of the upper clevis arm 25. In such location, the tongue 20 and drawbar 14 are hitched together.

To unhitch these parts, the hitch pin 40 is withdrawn downwardly to a lower position, as shown in FIG. 1. This is accomplished by pivoting lever 44 using a rope 51 which extends from the rearward end 52 of the lever upwardly through a guide ring 54 connected to the upper clevis arm 25. As shown in FIG. 1, rope 51 extends to the tractor seat 12 and is looped through a ring 55.

As can be seen from FIG. 1, when the tractor operator moves the tractor for connection of drawbar 14 to tongue 20, he is able to sight and look downwardly from above through hole 30 in upper clevis arm 25. When hole 30 is in alignment with the hole 15 in the drawbar, the operator knows that the parts are in proper location to receive the hitch pin 40. He merely then has to release rope 51 and spring 50 will operate to slide the hitch pin upwardly to couple the parts.

Also, if desired the operator can release rope 51 after pin 40 is below any part of drawbar 14. Upon movement of the tractor 10, the upper end of pin 40 slides against the under surface of the drawbar. When the clevis holes become aligned with drawbar hole 15, the hitch pin snaps into hitching position responsive to the force of spring 50.

It will be seen from the foregoing description that hitch device 35 of this invention in no way obstructs sighting through the upper hole 30 in clevis 22. At all times, the operator is able to see the upper clevis hole and can look down through it to the drawbar 14. Also, since the hitch pin projects upwardly through the bottom of the clevis and into the upper arm thereof, and not downwardly as is conventional, the hitch device provides no obstruction to the hitching operation. This structure enables the operator to achieve a satisfactory hitching regardless of the circumstances encountered and without having to leave the tractor seat 12.

The movement of the hitch pin is guided by the cylindrical bore of the hole 31 through the lower clevis arm 26. The relative movement of the lever 44 in the hitch pin is permitted by the lost-motion connection 41–42. The structure involved is simple, low cost and easily operated.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A hitch device for a vehicle tongue comprising a clevis on the tongue having an upper arm and a lower arm extending horizontally in vertically spaced relation to provide a space for receiving therebetween a drawbar, said upper arm and said lower arm each having a hole and the holes in the arms being in register with each other and having vertical axes, a hitch pin located on said clevis lower arm and extending upwardly through the hole in the lower arm, said hitch pin being slidable in a vertical direction relative to said clevis from a lower retracted position beneath said drawbar receiving space to an upper position projecting into said hole in said upper arm, a lever pivotally mounted on said lower arm and connected to said pin at one end, holding means for maintaining the hitch pin in said upper position, and means connected to an end of said lever opposite said one end for moving said pin to a down position and holding it in this position, and said last named means extending upwardly above said upper arm whereby an operator can sight through the holes in said arm when said pin is being held in a down position to facilitate coupling of said tongue to said drawbar.

2. A hitch device as recited in claim 1 wherein the pivot axis of said lever is transverse to the extension of said hitch pin, and a bolt parallel to said pivot axis extends through a slot in said one end of the lever for connecting said pin to said lever.

3. A hitch pin as recited in claim 2 wherein said holding means comprises a tension spring having one end connected to said clevis and an opposite end connected to said lever between said bolt and said pivot axis.

4. A hitch pin as recited in claim 3 wherein said means for moving said pin comprises a rope or the like which extends through a guide on the upper arm of said clevis, and said guide is spaced from said hole in the upper arm to hold said rope clear of the hole.

5. A hitch device for connecting a vehicle tongue to a tractor drawbar and controlled by an operator from his seat on the tractor comprising, in combination, a hitch element on said tongue located to project beneath said drawbar, said hitch element and said drawbar each having a hole the axes of which extend in a vertical direction, said tractor being so located that the operator is able to look downwardly through said drawbar hole and determine when said hitch element hole are in axial alignment, a hitch pin mounted on said hitch element and slidable in an up and down direction through said element hole, means supporting said hitch pin on said hitch element, spring means biasing said hitch pin toward an up direction, and means controlled by said operator from said tractor seat for sliding and holding said hitch pin in a down position below said drawbar, said holding means when released permitting said hitch pin to project upwardly through said drawbar hole to detachably connect the tongue and drawbar.

6. A hitch device, as recited in claim 1, wherein each of said arms comprises a pair of wall portions which converge toward said holes, the wall portions of each of the arms define an opening therebetween and the openings of each of the arms are in line in a vertical direction, said means for moving said pin comprises a flexible connector which extends upwardly through said openings.

7. A hitch device, as recited in claim 6, wherein a support bracket extends downwardly from said lower arm and is fixed thereto, and a central portion of said lever is pivotally connected to said bracket.

References Cited
UNITED STATES PATENTS

| | | | |
|---|---|---|---|
| 2,459,245 | 1/1949 | Seward | 280—515 |
| 2,470,531 | 5/1949 | Suhl et al. | 280—515 |
| 2,476,511 | 7/1949 | Ruth | 280—515 |
| 2,579,232 | 12/1951 | Hansen | 280—515 |
| 3,046,037 | 7/1962 | Cain | 280—515 |
| 3,146,003 | 8/1964 | De Ronde | 280—515 |

FOREIGN PATENTS 679,558    1/1930    France.

LEO FRIAGLIA, *Primary Examiner.*